(12) United States Patent
Obaidi et al.

(10) Patent No.: US 9,659,477 B1
(45) Date of Patent: May 23, 2017

(54) WIRELESS WEARABLE DEVICE PLATFORM

(71) Applicant: T-Mobile USA, Inc., Bellevue, WA (US)

(72) Inventors: Ahmad Arash Obaidi, Bellevue, WA (US); Darren J. Kress, Bothell, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 0 days.

(21) Appl. No.: 14/964,378

(22) Filed: Dec. 9, 2015

(51) Int. Cl.
| | | |
|---|---|---|
| *G08B 1/08* | (2006.01) | |
| *G08B 21/18* | (2006.01) | |
| *G08B 6/00* | (2006.01) | |
| *G08B 5/36* | (2006.01) | |
| *G06F 1/00* | (2006.01) | |

(52) U.S. Cl.
CPC ............... *G08B 21/18* (2013.01); *G08B 5/36* (2013.01); *G08B 6/00* (2013.01); *G06F 1/00* (2013.01)

(58) Field of Classification Search
CPC .................... A61B 1/00; G06F 1/00
See application file for complete search history.

(56) References Cited

U.S. PATENT DOCUMENTS

| | | | |
|---|---|---|---|
| 2011/0224505 A1* | 9/2011 | Sadhu | A61B 5/0006 600/301 |
| 2013/0279306 A1* | 10/2013 | Jackson | G04G 21/08 368/282 |
| 2013/0337978 A1 | 12/2013 | Robinette et al. | |
| 2014/0218852 A1 | 8/2014 | Alcazar | |
| 2015/0091764 A1 | 4/2015 | Hsieh et al. | |
| 2015/0119769 A1 | 4/2015 | Golbin et al. | |
| 2015/0134249 A1* | 5/2015 | Yen | G01C 21/20 701/541 |
| 2015/0188217 A1 | 7/2015 | Tsai et al. | |
| 2015/0188843 A1* | 7/2015 | Chauhan | H04L 47/801 709/225 |
| 2015/0302719 A1 | 10/2015 | Mroszczak et al. | |
| 2016/0022210 A1* | 1/2016 | Nuovo | A61B 5/681 600/301 |

* cited by examiner

*Primary Examiner* — Shirley Lu
(74) *Attorney, Agent, or Firm* — Lee & Hayes, PLLC

(57) ABSTRACT

Wearable electronic devices configured to connect to cellular network(s) via radio transceiver(s) and methods of using such devices are described herein. These wearable electronic devices receive data from a sensor and transmit the data or a notification regarding the data via the radio transceiver. The wearable electronic devices can also provide feedback to the user regarding the data collected, or regarding indications received via the radio transceiver from a third party provider, including a cloud service. Further, the wearable devices may be customizable such that additional functionality may be added by downloading additional software applications and/or by the addition of physical modules, such as those containing additional sensors.

20 Claims, 7 Drawing Sheets

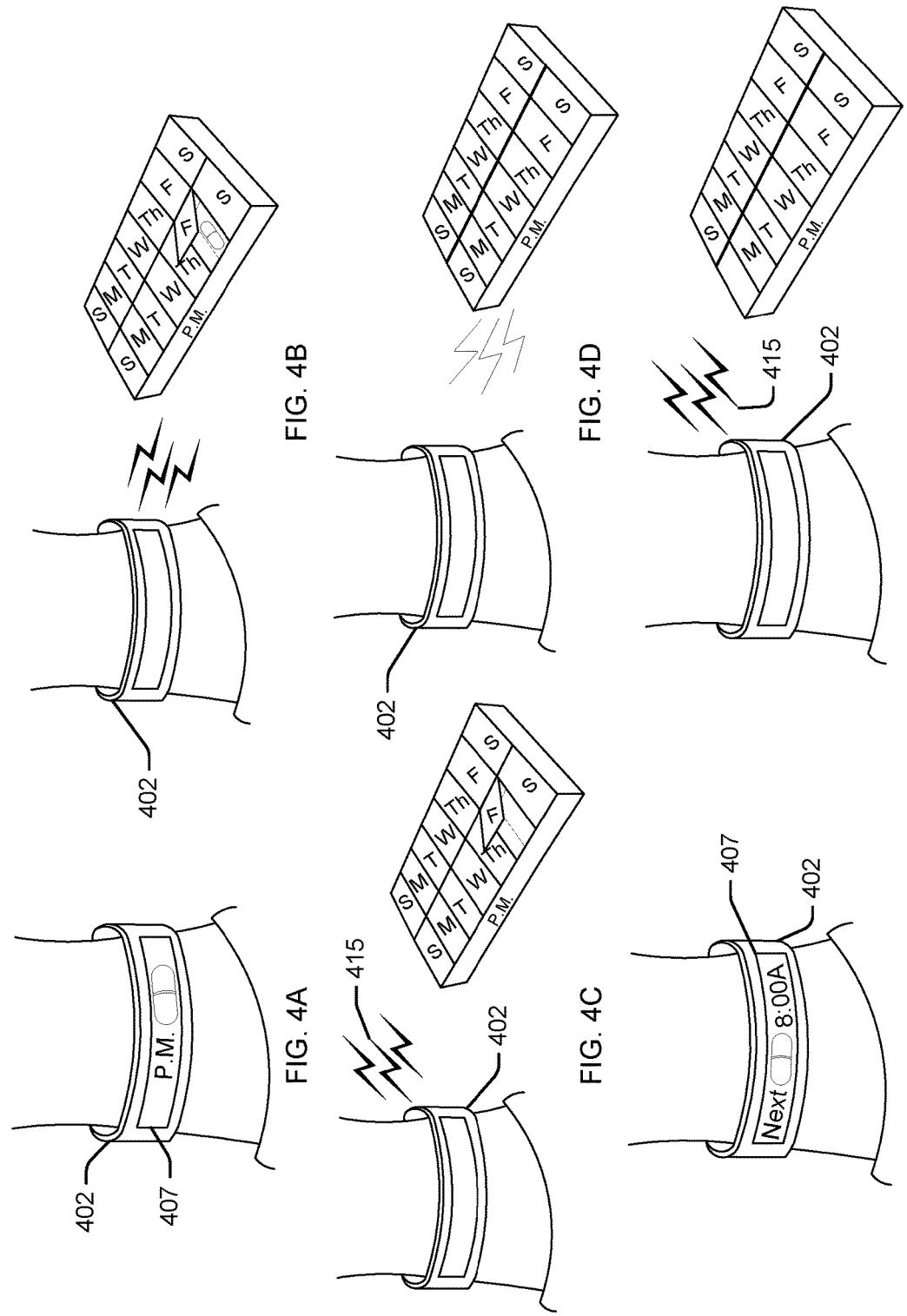

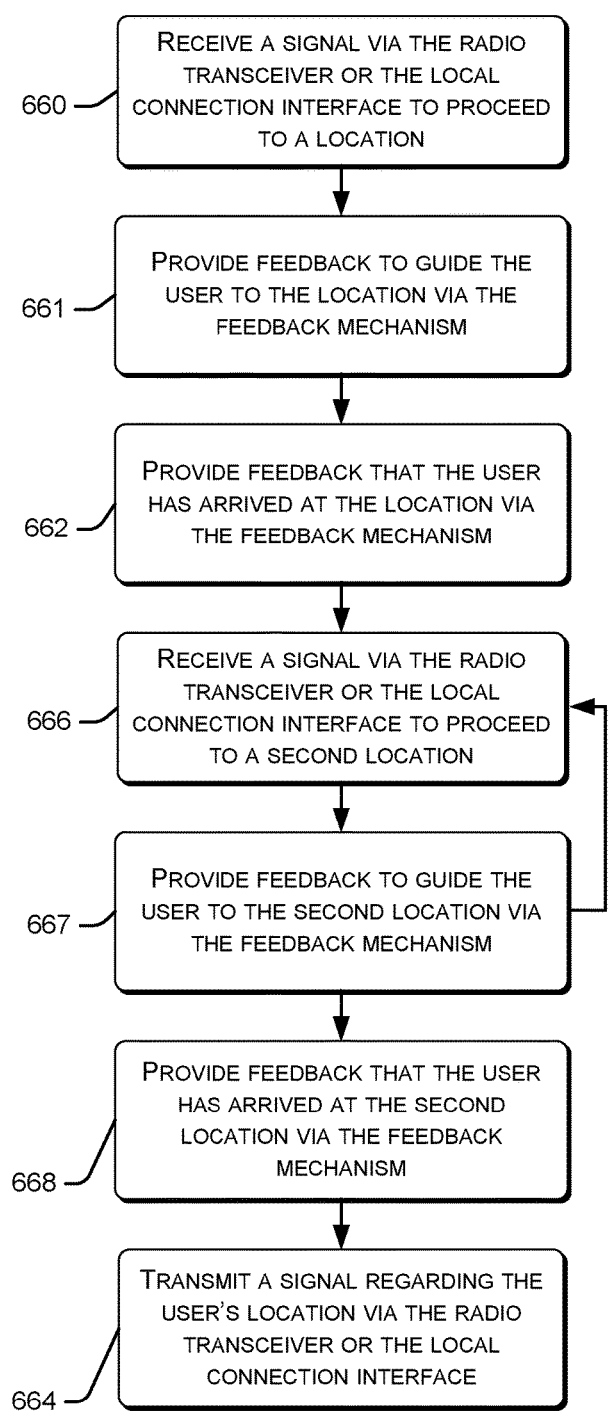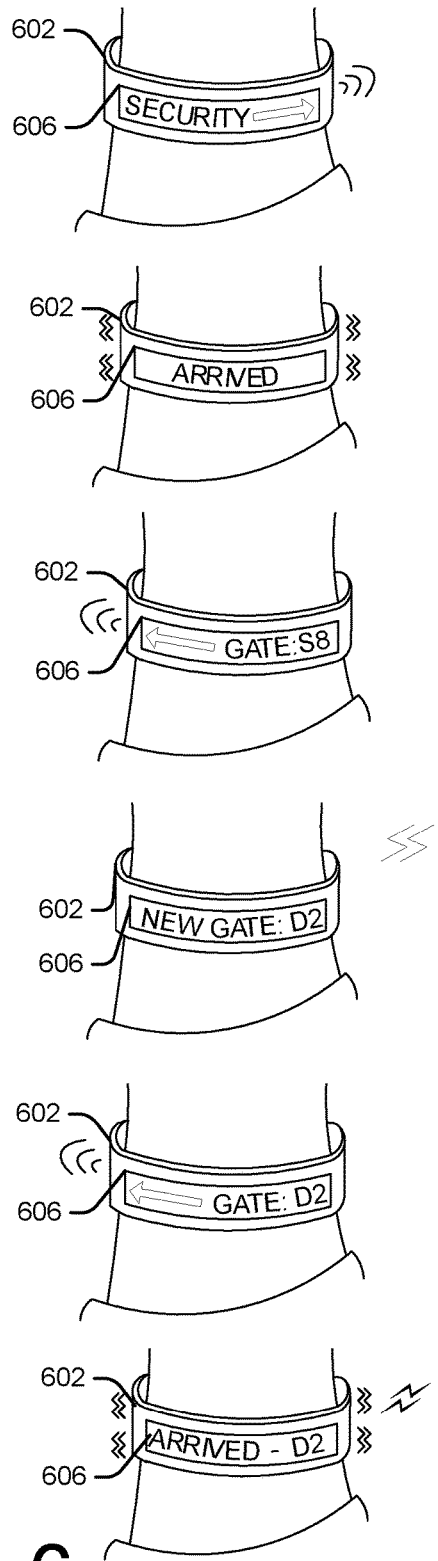
FIG. 6

WIRELESS WEARABLE DEVICE PLATFORM

BACKGROUND

Many wearable devices for monitoring the activities of a user are known. Such devices generally include a sensor that collects data which is stored on the device and later uploaded to a computing device, or transmitted via a link, such as a Bluetooth® connection, to a cellular telephone. These devices typically include a limited, defined set of abilities, such as a pedometer, and are generally designed to serve specific purposes. As a result, the devices are usually at most minimally customizable by the user.

BRIEF DESCRIPTION OF THE DRAWINGS

The detailed description is set forth with reference to the accompanying figures, in which the left-most digit of a reference number identifies the figure in which the reference number first appears. The use of the same reference numbers in different figures indicates similar or identical items or features.

FIGS. 4A-4F are illustrations of example device in use, in accordance with various embodiments.

FIG. 6 is a flowchart showing a method of using a device, as well as illustrations of a device in use, in accordance with various embodiments.

DETAILED DESCRIPTION

Described herein are wearable electronic devices. In some implementations, the described wearable electronic devices are configured to communicate with a telecommunication network, such as a Long Term Evolution (LTE), 2G, 3G, 4G, or 5G network, via a radio transceiver. The wearable electronic devices (hereinafter "wearable devices") each include a housing and a feedback component. Such wearable devices could be in the form of a wristband, an armband, a glove, ankleband, or any other form factor that would not interfere with the functionality of such a wearable device. In embodiments, the wearable device further includes a sensor. In such embodiments, the wearable device receives data from the sensor and transmits the data, or a notification related to the data, via the radio transceiver. Subsequently, the wearable device may receive an indication in response to the transmitted data or notification, which can then be relayed to the user via a feedback component. In some embodiments, the indication can be relayed to a user on a display, or using vibratory or auditory feedback. Further, the wearable devices may be customizable such that additional physical modules, such as those containing additional sensor(s), may be added.

Figure 1:
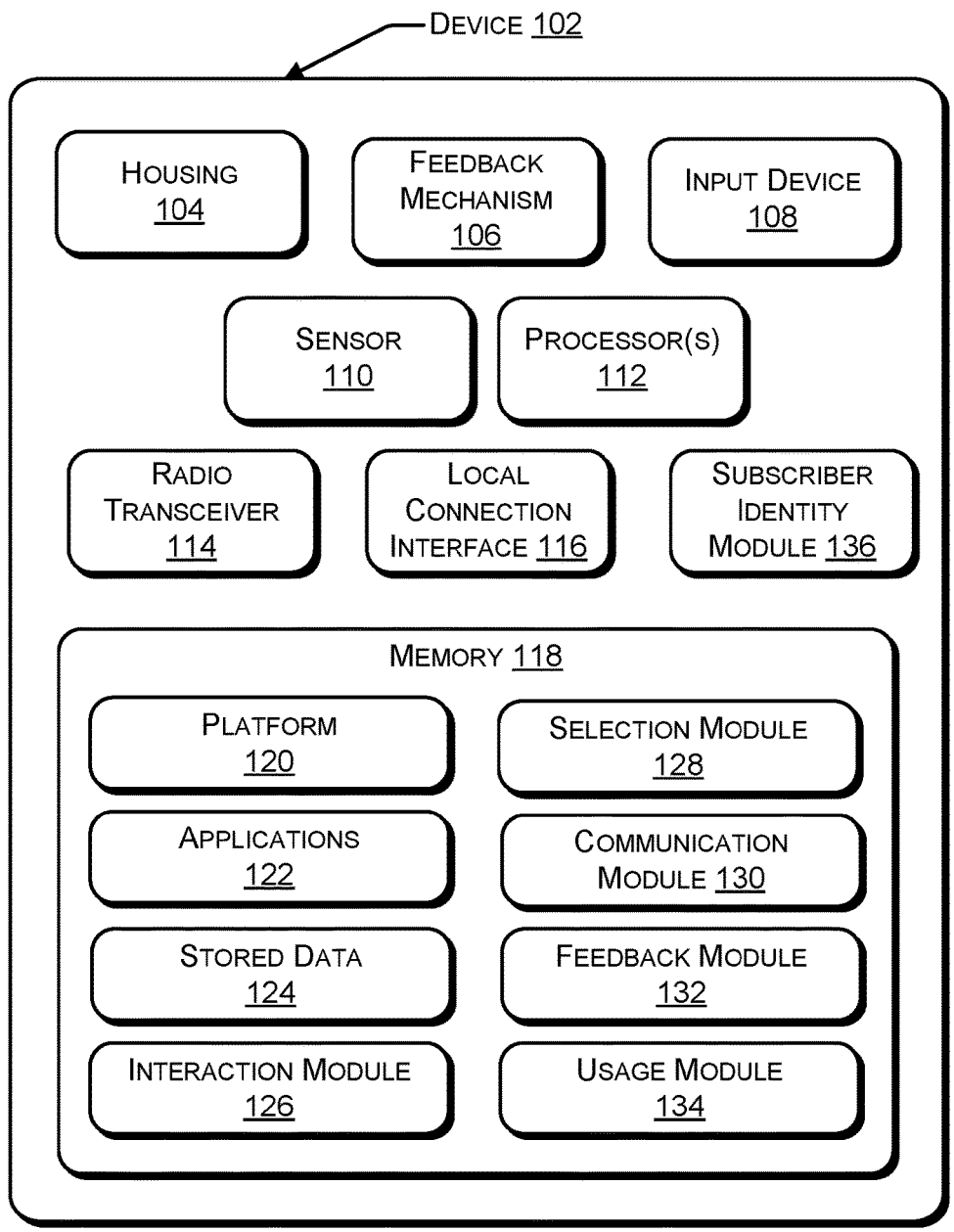
FIG. 1 is a block diagram showing an overview of an example device system architecture, in accordance with various embodiments.

FIG. 1 illustrates an overview of an example wearable device system architecture, in accordance with various embodiments. As shown in FIG. 1, the wearable device 102 may include a housing 104, a feedback mechanism 106, an input device 108, a sensor 110, one or more processor(s) 112, a radio transceiver component 114, a local connection interface 116, a Subscriber Identity Module (SIM) 136, and a memory 118 storing at least a platform 120 (including an operating system (OS)), one or more software applications 122, stored data 124, an interaction module 126, a selection module 128, a communication module 130, a feedback module 132, and a usage module 134.

The housing 104 can be formed from any sort of material, such as plastic, metal, or a composite material. In some embodiments, the housing 104 includes the external parts of the wearable device 102 and partially or completely encases other internal components. In one implementation, the housing 104 comprises two pieces snapped, glued, or otherwise attached to one another. In addition to encasing the other components, the housing 104 may also include an attachment mechanism that allows for additional components, such as additional physical modules containing sensor(s), to be added. Further, the housing 104 may have any color and combination of decorative features.

The housing 104 may also include an integrated feedback mechanism 106. The feedback mechanism 106 may be any sort of output device known in the art, such as a display (e.g. display 307 illustrated in FIG. 3), a light bulb, one or more light emitting diodes (LEDs), speakers, a vibrating mechanism, or a tactile feedback mechanism. For example, the housing 104 might include an opening for two light bulbs, one red and one green. The green bulb could indicate to turn right and the red could indicate to turn left. In another example, the housing 104 includes a cover or cap for a speaker, the speaker producing a sound based on data received from the sensor. In various embodiments, the sounds could indicate that a user's heartrate has dropped below a threshold level, that the user is intoxicated, that the user should turn left, and the like. In yet another example, the feedback mechanism 106 is entirely internal to the housing 104 and comprises a vibrating mechanism that vibrates at different intensities and durations to indicate different results. The feedback mechanism 106 may also include ports for one or more peripheral devices, such as headphones, peripheral speakers, or a peripheral display.

In various embodiments, the display (e.g. display 407 illustrated in FIG. 4) is a liquid crystal display or any other type of display commonly used in telecommunication devices. For example, display may be a touch-sensitive display screen, and can then also act as an input device or keypad, such as for providing a soft-key keyboard, navigation buttons, or the like.

In various embodiments, input device(s) 108 include any sort of input devices known in the art. For example, input devices 108 may include a microphone, a keyboard/keypad, or a touch-sensitive display (such as the touch-sensitive display screen described above). A keyboard/keypad may be a push button numeric dialing pad (such as on a typical telecommunication device), a multi-key keyboard (such as a conventional QWERTY keyboard), or one or more other types of keys or buttons, and may also include a joystick-like controller and/or designated navigation buttons, or the like.

The sensor 110 could be a heartrate sensor, an oxygen sensor, an accelerometer, a gravity sensor, a gyroscope, a sweat sensor, a skin temperature sensor, an environmental temperature sensor, and the like. The sensor 110 can be encased in the housing 104 or the sensor 110 can be separate components that can be operably connected to the wearable device by, for example, the attachment mechanism of the housing 104. In some embodiments, the sensor 110 can be physically connected to the housing 104, such as through a plug (including mini-Universal Serial Bus (USB), micro-USB, and the like), a latch system, a threaded connection, or any other suitable connector system as would be understood by one of skill in the art. In other embodiments, the sensor 110 can be operably connected via a local connection, such as through a Bluetooth® connection.

In some embodiments, the wearable device 102 includes processor(s) 112 within the housing 104. The processor(s) 112 are central processing unit(s) (CPU) or other processing unit(s). In some embodiments, the processor(s) 112 is a central processing unit (CPU), a graphics processing unit (GPU), or both CPU and GPU, or any other sort of processing unit.

In some embodiments, the processor(s) 112 are also communicatively coupled to radio transceiver component(s) 114. The radio transceiver component(s) 114 include any sort of radio transceivers. For example, radio transceiver(s) 114 may include a radio transceiver and interface that performs the function of transmitting and receiving radio frequency communications via an antenna. The radio interface facilitates wireless connectivity between the wearable device 102 and various cell towers, base stations, and/or access points. In some embodiments, the radio transceiver component 114 has one or more radio communication technology specific antennae and modems for communicating over one or more of LTE connectivity, other 4G connectivity (e.g., High-Speed Data Packet Access (HSDPA)/Evolved High-Speed Packet Access (HSPA+)), 5G connectivity, 3G connectivity (Universal Mobile Telecommunications System (UMTS) technology, Code Division Multiple Access (CDMA) technology, Global System for Mobile Communications (GSM) technology), 2G connectivity, etc.

Further, in various embodiments, the wearable device 102 may include a local connection interface 116. The local connection interface 116 may be communicatively coupled to the processor(s) 112. The local connection interface 116 may be any sort of interface. Local connection interfaces 116 include any one or more of a wireless LAN interface or a near field interface. The wireless LAN interface can include a Wi-Fi interface, a Wi-Max interface, or a Bluetooth® interface that performs the function of transmitting and receiving wireless communications using, for example, the IEEE 802.11, 802.16 and/or 802.20 standards. The local connection interface 116 can include a Bluetooth® interface or RFID for transmitting and receiving near field radio communications via a near field antenna. For example, the local connection interface 116 may be used for functions, as is known in the art, such as communicating directly with nearby devices that are also, for instance, Bluetooth® or RFID enabled. A reader/interrogator may be incorporated into the wearable device 102.

In various embodiments, the wearable device 102 can use a local connection interface 116 to communicate directly with a telecommunication device. In various embodiments, the telecommunication device is any sort of computing device. The telecommunication device can be a cellular phone, a PDA, a personal computer (PC), a laptop computer, a workstation, a server system, a tablet computer, a television, a media player, a digital video recorder, a game device, or a set-top box, or any other sort of device. The telecommunication device can belong to the same user as the wearable device 102 and, in some embodiments, may be paired to the wearable device 102 through, e.g., Bluetooth® pairing. In one embodiment, the device is paired to or otherwise locally connected to a plurality of telecommunication devices. As discussed above, the pairing and local connection may be achieved through any one or more networks, such as a local area network (LAN) or a PAN, such as a Bluetooth® network. Communications between the telecommunication device and wearable device 102 utilize any sort of communication protocol known in the art for sending and receiving messages. Additionally, the wearable device 102 may have a further network connection to one or more remote service provider networks or other networks, such as cellular networks and/or data networks, including wide area networks (WANs), LANs, PANs, and/or the Internet.

In various embodiments, the processor(s) 112 are further communicatively coupled to memory 118. The memory 118 generally includes both volatile memory and non-volatile memory (e.g., RAM, ROM, EEPROM, Flash Memory, miniature hard drive, memory card, optical storage, magnetic cassettes, magnetic tape, magnetic disk storage or other magnetic storage devices, or any other medium). Memory 118 can also be described as computer storage media and may include volatile and nonvolatile, removable and non-removable media implemented in any method or technology for storage of information, such as computer readable instructions, data structures, program modules, or other data.

In some embodiments, the wearable device 102 includes a SIM (subscriber identity module) card 136, which is a removable memory card that can be used to identify a user of the wearable device 102 to a service provider network. In various embodiments, the SIM card is communicatively coupled to the radio transceiver 114, the memory 118, and/or the processor(s) 112.

The memory 118 stores data and modules 126-134. These data and modules 126-134 include a platform 120. In various embodiments, the platform 120 includes an operating system and one or more applications that are pre-programmed on the wearable device 102 at the time of initiation of the user's telecommunication services or prior to that time. The operating system may be any sort of device operating system. In various embodiments, the operating system may be a common mobile device operating system, including Microsoft Windows Mobile®, Google Android®, Apple iOS®, or Linux Mobile®. The applications may be any sort of applications, such as an email client, a calendar, a contact book, a text messaging client, a GPS component, a browser, etc. Additionally, the data and modules 126-134 further include other applications 122, such as third party applications, enhancing the wearable device 102 with various capabilities.

The data and modules 126-134 may include a device identifier. The device identifier is a value such as integer or string that uniquely identifies the wearable device 102. Such a device identifier may be stored in any part of the memory 118 and may be associated with an application, module, process, or thread, or may be stored in a part of memory 118 that is accessible to all application, modules, processes, and threads of the wearable device 102. In one embodiment, the device identifier is a read-only value that is programmed into memory 118 prior to or at the time of sale of the wearable device 102.

In some embodiments, memory 118 may optionally include stored data 124. The stored data 124 may be pre-programmed content, such as a song, picture, or theme that is stored in memory 118 prior to or at the time of sale of the wearable device 102. The stored data 124 may be provided to the telecommunication device when the wearable device 102 and telecommunication device pair, establish a connection, or at some other time.

In various embodiments, the memory 118 stores an interaction module 126 that is programmed to be operated by the processor(s) 112 to detect user interactions. The interaction module 126 may comprise any number of sub-modules, applications, threads, or processes and may include stored data associated with the interaction module 126. Upon initiation of user interaction with the input device 108, the interaction module 126 begins to track the user interaction such as noting movements, time since the initiation of the user interaction, and the like. The interaction module 126 tracks user interaction by communicating with a component associated with the input device 108 or some other mechanism. In various embodiments, the interaction module 126 is further configured to track user interactions affecting a change of device mode, including the activation or deactivation of specific sensors 110, the change of feedback mechanism 106, and the like. For example, the interaction module 126 could communicate with a driver or other software of a motion sensor or other component to receive notification of a user interaction. In some embodiments, the interaction module 126 is only notified of user interactions affecting a mode change and user interactions with input device 108. In other embodiments, the interaction module 126 is notified of all interactions (e.g., all motion detected by a motion sensor) and differentiates among the interactions based on rules and thresholds to determine interactions that indicate a user's intention to switch the device mode. Upon determining that user interaction affecting a mode change has occurred, the interaction module 126 updates the device mode.

In some embodiments, the selection module 128 may comprise any number of sub-modules, applications, threads, or processes and may include stored data associated with the selection module 128. As mentioned above, the selection module 128 is invoked by the interaction module 126. Upon receiving user interaction affecting a mode change, the interaction module 126 invokes the selection module 128 which then retrieves the device mode from memory 118.

In various embodiments, the communication module 130 may comprise any number of sub-modules, applications, threads, or processes and may include stored data associated with the communication module 130. The communication module 130 is configured to send and receive messages via radio transceiver or via the local connection between the wearable device 102 and telecommunication device. The communication module 130 may communicate with the local connection interface(s) 116 or radio transceiver 114 to send and receive messages via the local connection interface(s) 116 or radio transceiver 114. These messages may include signals and notifications. In some embodiments, in addition to sending and receiving messages, the communication module 130 may participate in pairing the wearable device 102 to the telecommunication device or in establishing a local connection. The communication module 130 may be invoked by the selection module 128 and may be passed a signal or message including a signal to transmit, for example, to the telecommunication device or to a third party provider. Further, the communication module 130 may receive, via the local connection interface(s) 116 or radio transceiver 114, indications or notifications from a secondary device or from a third party. In response to receiving the indication, etc., the communication module 130 invokes the feedback module 132 provide feedback.

In some embodiments, the feedback module 132 may comprise any number of sub-modules, applications, threads, or processes and may include stored data associated with the feedback module 132. In some embodiments, the feedback module 132 receives feedback via the communication module 130. In other embodiments, the feedback module 132 receives a message from the communication module 130 and creates a feedback message in a form capable of being understood by the wearable device 102. Upon receiving the feedback, the feedback module 132 interfaces with a driver or other software of the feedback mechanism 106 and commands the feedback mechanism 106 to do one of a number of things based on the feedback. In some embodiments, the feedback module 132 may cause a message to be displayed via a user interface on the display of the wearable device 102. For example, if the feedback mechanism 106 is a display as mentioned above, and the feedback is "turn left," the feedback module 132 may instruct the feedback mechanism 106 to display an arrow pointing to the left for some specified period of time to indicate the feedback to the user. In particular embodiments, the feedback module 132 may cause the feedback mechanism 106 of the wearable device 102 to vibrate. In other embodiments, the feedback module 132 may cause the feedback mechanism 106 of the wearable device 102 to emit a sound.

In some embodiments, the wearable device includes a device identifier and a usage module 134 that is configured to communicate with a secondary device, such as a locking medication dispenser, a vehicle, a lock, etc., via the local communication interface 116. A user may cause the wearable device 102 to send a request to create a permissive session during which the secondary device may perform an operation, such as dispensing medication, switching on, unlocking, etc. The user may cause the wearable device to send the request by positioning the wearable device 102 near the secondary device, via the input device 108, or the like. The request may include the device identifier. In some embodiments, the wearable device 102 or the secondary device may use a logger to determine a status, e.g. whether a dose of medication has been dispensed or not. Upon determining that the status is "undispensed," for example, a response may be transmitted that grants the request by creating a permissive session. Upon determining that the usage status is, for example, "dispensed," a response may be transmitted that denies the request, e.g., does not create a permissive session. In some embodiments, secondary device may include a controller to prevent the secondary device from dispensing, operating, unlocking, etc. outside of a permissive session.

Figure 2:
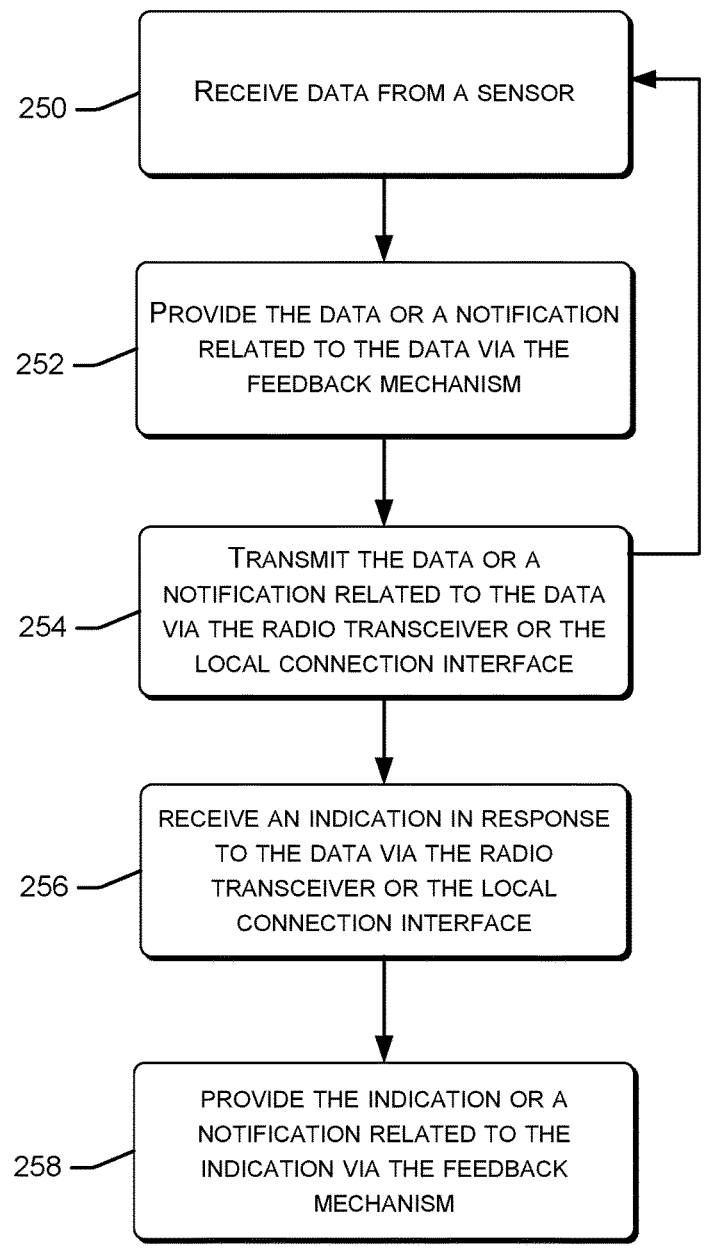
FIG. 2 is an example of a flowchart showing a method of use of a device described herein, in accordance with various embodiments.

FIG. 2 illustrates an overview of a method of the disclosure. At box 250, data is received from a sensor. The data or a notification regarding the data is then presented by the feedback mechanism at box 252. In some embodiments, the feedback mechanism can provide feedback in the form of a display, vibration, and/or sound. At box 254, the data or a notification regarding the data is transmitted via the radio transceiver or the local connection interface. In response, an indication may be received via the radio transceiver or the local connection interface, as can be seen in box 256. Further, the indication or a notification related to the indication can be provided to the user via the feedback mechanism at box 258.

Figure 3A:
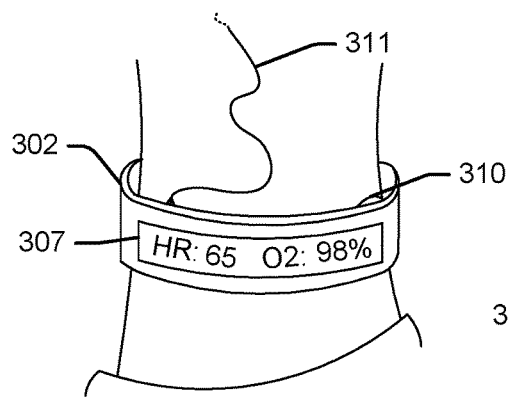
FIGS. 3A-3E are illustrations of example device in use, in accordance with various embodiments.
Figure 3B:
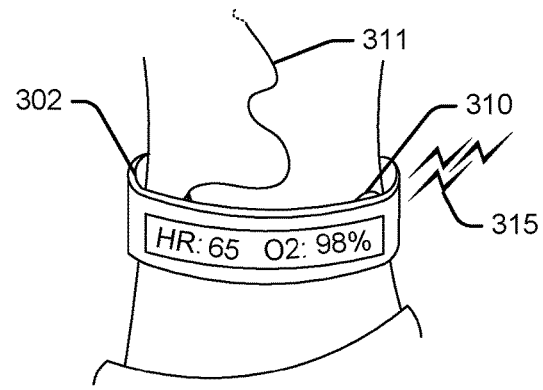

FIGS. 3A-3E illustrate a second overview of a customized device. As shown in FIG. 3A, the wearable device 302 receives data detected by two sensors 310 and 311. In this embodiment, the sensors are heart rate 310 and oxygen sensors 311. The sensors can be encased in the housing (e.g.

heart rate sensor 310) or be separate components that are plugged into a port in the housing (e.g. oxygen sensor 311). In particular embodiments, the input or a notification related to the input can be displayed on the display 307. The input or a notification related to the input can then be transmitted in a signal 315 via a radio transceiver component (not shown) or a local connection interface (not shown), as can be seen in FIG. 3B. In various embodiments, the input or the notification related to the input can be transmitted to a computing device in the medical facility that is monitored by medical facility staff. In embodiments, the wearable device 302 may receive one or more readings when prompted, at periodic intervals, continuously, at random, etc. In other embodiments, the readings could be transmitted to a cloud storage account.

Figure 3C:
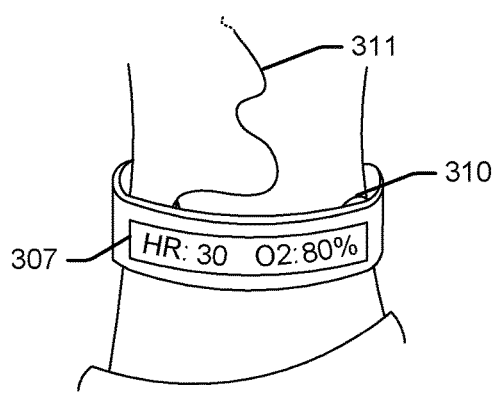
Figure 3D:
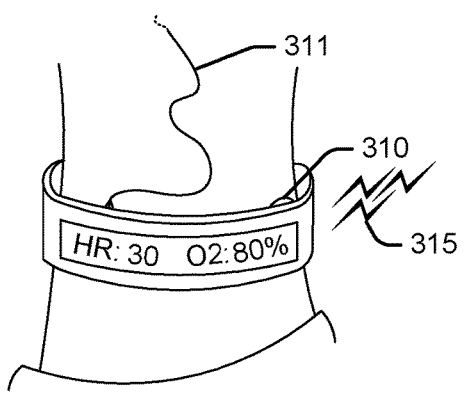
Figure 3E:
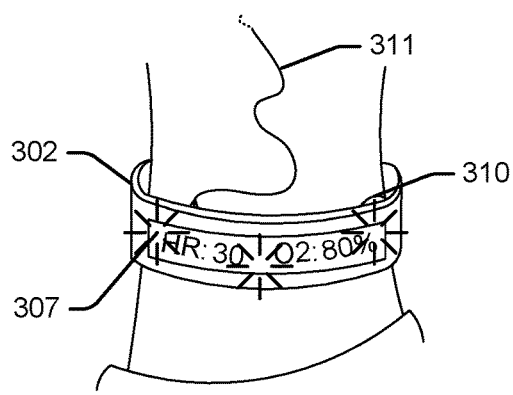

As illustrated in FIG. 3C, a second reading is detected from the sensors 310 and 311, and the second reading or a second notification related to the second reading is displayed on the display 307. The second reading, or the second notification related to the second reading, is then transmitted in a signal 315 via a radio transceiver component or a local connection (FIG. 3D). In some embodiments, the wearable device 302 provides feedback, such as a visual alert via the display 307 or audible alert, in response to a reading detected by the sensor and/or in response to notification received by the device (FIG. 3E).

FIGS. 4A-4F illustrate an overview of a wearable device customized for a further medical use. As can be seen in FIG. 4A, the wearable device 402 receives a notification based on an appointment set at a specific time, in this case, the notification alerts the user via the display 407 that it is time for their afternoon medication. The user then positions their wearable device 402 near a locking medication dispenser in order to dispense the medication for Friday afternoon (FIG. 4B). In various embodiments, the wearable device 402 and the medication dispenser communicate via a Bluetooth® connection through the local connection interface (not shown). In some embodiments, the usage module of the wearable device 402 is configured to communicate with the medication dispenser via the Bluetooth® connection. By positioning the wearable device 402 near the locking medication dispenser, the user causes the wearable device to send a request including the device identifier in order to create a permissive session during which the medication dispenser may dispense the requested medication. In this embodiment, the medication dispenser uses the logger to determine the status of the Friday afternoon medication dose, e.g. whether the medication has been dispensed or not (undispensed). Upon determining that the usage status is "undispensed" and that it is within the specific window of time for taking that specific dose, a response is transmitted that grants the request by creating a permissive session and thereby causes the medication dispenser to dispense the medication.

After the user has unlocked their medication, the wearable device 402 then transmits a notification signal 415 via the radio transceiver (not shown) that the dose has been dispensed (FIG. 4C). Further, the notification could be transmitted to a cloud storage account or to a third party, such as a medical professional, a family member, an insurance company, or any other party that has an interest in tracking the user's habits regarding their medication. This can assist medical providers and/or family members in tracking patients to ensure that medication is being properly dispensed.

In some embodiments, the user may not remember when they last took their medication or may attempt to open their medication dispenser for another reason. If the user positions their wearable device 402 near the medication dispenser a second time, the wearable device 402 may not emit a signal to dispense further medication (FIG. 4D). In some embodiments, a similar process to the one described above is used. The user again causes the wearable device to send a request to create a permissive session during which the medication dispenser may dispense the requested medication. However, upon determining that the usage status is "dispensed", a response is transmitted that denies the request, e.g., does not create a permissive session.

The wearable device 402 may also show on the display 407 a notification that their next dose of medication should be administered at a specific time, as shown in FIG. 4E. In particular embodiments, the wearable device 402 may transmit a second notification signal 415 regarding the user's attempt to open the medication dispenser a second time (FIG. 4F).

Figure 5:
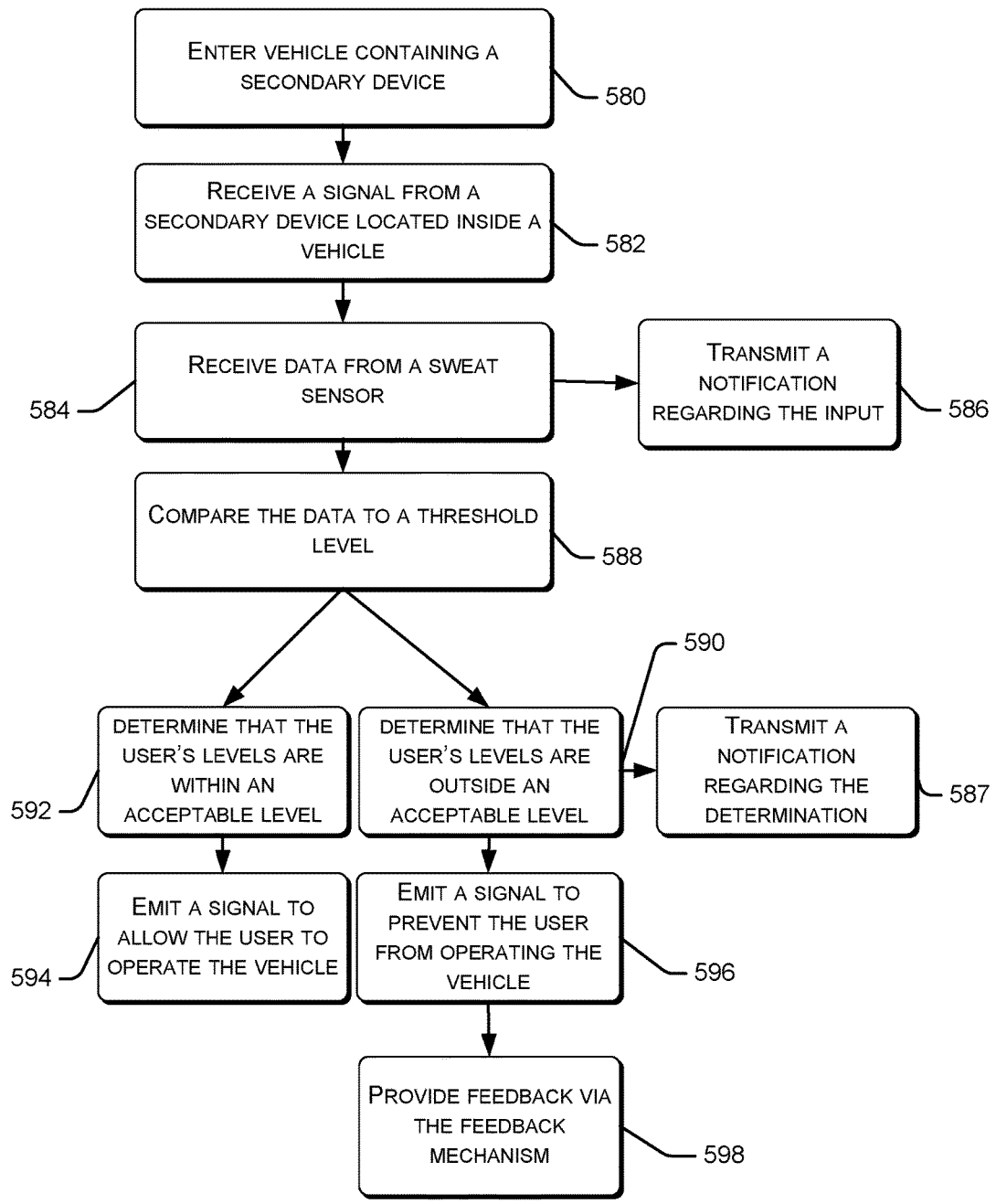
FIG. 5 is a flowchart showing a method of using a device for a specialized purpose, in accordance with various embodiments.

FIG. 5 illustrates a particular embodiment of the disclosure. In this embodiment, the user enters a vehicle, such as a car, truck, backhoe, forklift, etc., while wearing a wearable device as shown in box 580. The wearable device receives a signal from a secondary device located in the car which indicates that the user is in position to operate the vehicle (box 582). A sensor on the wearable device, such as a sweat sensor, then records data regarding the user's blood alcohol level and/or data regarding levels of any narcotics that have been taken by the user (box 584). In some embodiments, the wearable device can transmit a notification regarding the user's blood alcohol or narcotics level (box 586) to a cloud storage account and/or to a third party, such as law enforcement or the user's employer, via a radio transceiver or a local connection interface.

The wearable device can then compare the input to a threshold 'acceptable level' as seen in box 588. In some embodiments, the acceptable level can be stored on the wearable device. In other embodiments, the wearable device can transmit the user's level(s) to a third party and/or cloud storage account, which can then compare the input to the threshold level and provide a response. The response received by the wearable device can indicate whether the user's level(s) are acceptable for the given task. In various embodiments, if the user's levels are equal to an acceptable level it may be treated as if they were above or below depending on the circumstances, user preference, and the like.

Based on the comparison between the data received from the sensor and the acceptable level, the wearable device (or in other embodiments, a cloud storage account and/or a third party) can determine if the user's levels are outside (box 590) or within (box 592) an acceptable level. In some embodiments, by positioning the wearable device near the secondary device, the user causes the wearable device to send a request including the device identifier and the data regarding the user's blood alcohol level and/or data regarding narcotics levels in order to create a permissive session during which the vehicle may operate. In particular embodiments, the request includes the determination that the user's levels are within or outside an acceptable level.

If the user's levels are within an acceptable level, the wearable device emits a signal to allow the user to operate the vehicle as shown in box 594, and the vehicle can then be switched on. In various embodiments, upon determining that the user's levels are acceptable for the given task, a response is transmitted that grants the request by creating a permissive session and thereby causes the vehicle to switch on.

If the user's levels are outside an acceptable level, the wearable device emits a signal that prevents the user from operating the vehicle as shown in box 596, and the vehicle remains off. In some embodiments, upon determining that the user's levels are outside an acceptable level for the given task, the secondary device transmits a response that denies the request, e.g., does not create a permissive session. Additionally, in particular embodiments if the user's levels are outside an acceptable level, the wearable device can provide feedback via the feedback mechanism 598 and/or cause the secondary device to emit an alert.

In other embodiments, the wearable device can transmit the determination that the user's level(s) are within or outside an acceptable level to a third party and/or cloud storage account. In certain embodiments, the wearable device can transmit the input from the sensor and/or the determination that the user's level(s) are outside an acceptable level to a third party and/or cloud storage account (box 587) only if the user's level(s) are determined to be above the acceptable level.

FIG. 6 shows a further embodiment of a wearable device and its use. In this illustrative example, a user arrives at an airport. Upon checking in for their flight, the wearable device 602 receives a signal from the airline or the airport via the radio transceiver or a location connection interface, such as a Bluetooth® connection, that the user has successfully checked in to their flight and should proceed to a security checkpoint as shown in box 660. At this point, the airline and/or airport may transmit gate information to the wearable device. The wearable device 602 then guides the user with arrows on the display, audio feedback, and/or vibratory feedback via the feedback mechanism 606 toward the security checkpoint, as shown in box 661. The wearable device can utilize GPS through the radio transceiver or local connection interfaces throughout the airport as well as positional sensors to determine where the user is and how to direct them to the desired location. The wearable device 602 can provide feedback to the user via the feedback mechanism 606 that the user has arrived in a designated area near the security checkpoint, as seen in box 662.

The wearable device 602 receives a signal from the airline or airport once the user has passed through the security checkpoint that the user should proceed to the gate assigned to their flight (box 666). In various embodiments, the wearable device 602 may receive gate assignment information from the airline and/or airport at any point during this process. In particular embodiments, the wearable device 602 may receive periodic updates regarding gate assignment information. In other embodiments, the wearable device 602 may receive updates regarding gate assignment information in response to changes in the gate assignments. After passing through the security checkpoint, the wearable device 602 guides the user with arrows on the display, audio feedback, and/or vibratory feedback via the feedback mechanism 606 toward the assigned gate (box 667). Once the user has arrived in a designated area near the assigned gate or within a designated distance of the gate, the wearable device 602 can alert the user via the feedback mechanism 606 that they have arrived (box 668).

In various embodiments, the wearable device 602 can transmit a signal regarding the user's location to the airline and/or airport a pre-determined amount of time prior to the assigned boarding time, as shown in box 664. In particular embodiments, the wearable device 602 can transmit a notification regarding the user's location to the airline and/or airport a pre-determined amount of time prior to the assigned boarding time only if the user is outside of the designated zone near the assigned gate. Thus, the airline and/or airport can determine if any passengers appear to be lost and make announcements and/or route personnel to assist them.

Figure 7:
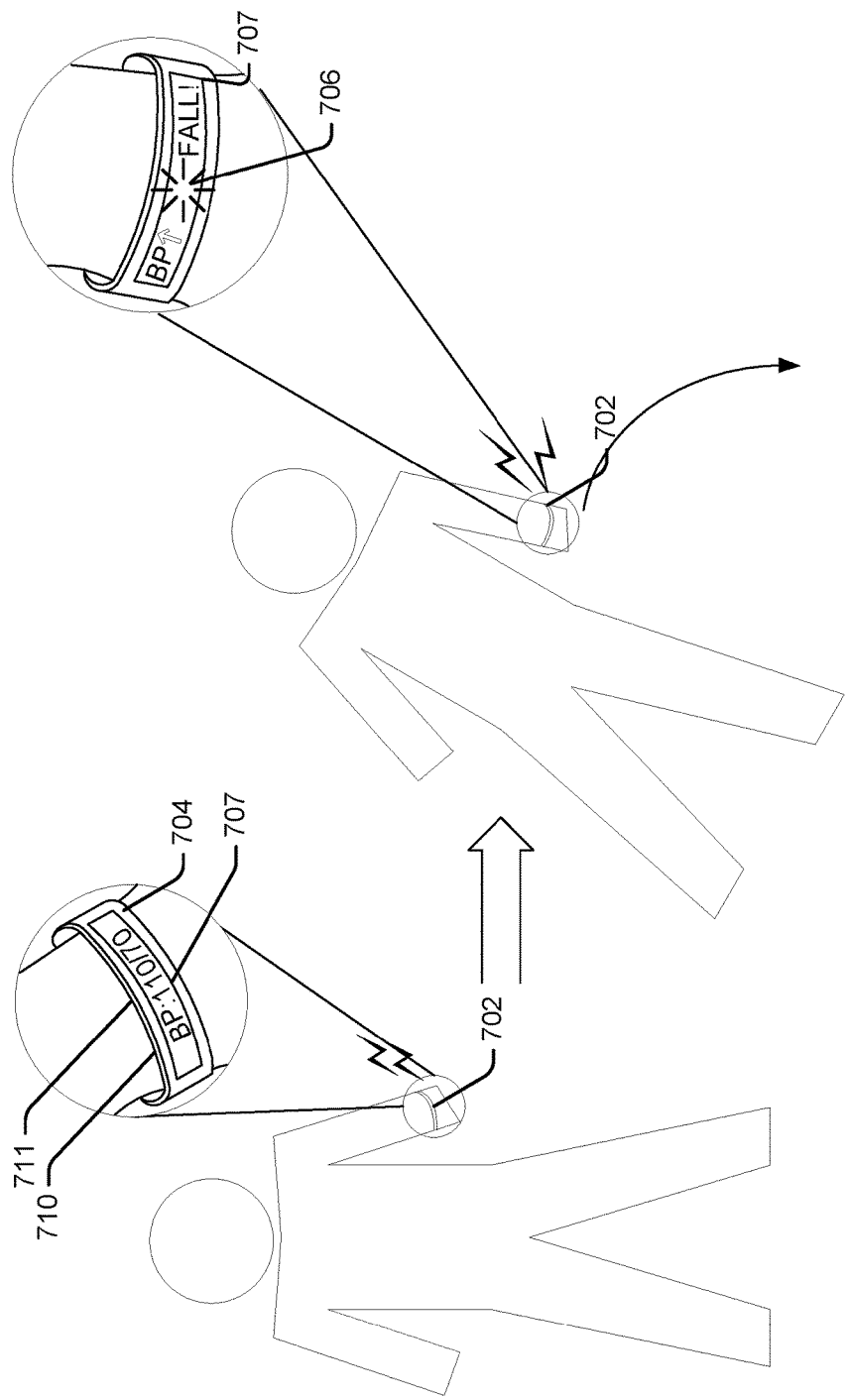
FIG. 7 is an illustration of an example device for a specialized use, in accordance with various embodiments.

As illustrated in FIG. 7, a user, such as a law enforcement officer, first responder, soldier, miner, or any other user that is exposed to hazardous conditions, is wearing a wearable device 702. The wearable device 702 includes a blood pressure sensor 710 and an accelerometer 711 contained in the housing 704. In some embodiments, feedback regarding the data collected by the sensors can be provided by the feedback mechanism, such as a display 707. The data collected by the sensors 710 and 711 may be transmitted via the radio transceiver or a local connection interface (not shown).

In the event the user is in distress, for example, if the user is knocked to the ground, the blood pressure sensor 710 will record data that indicates that the user's blood pressure has spiked or decreased, and the accelerometer 711 will record that the user has quickly moved to the ground. The feedback mechanism 706, including the display 707 of the wearable device 702 may alert the user of the change in blood pressure or the acceleration toward the ground. The data collected by the sensors 710 and 711 may be transmitted via the radio transceiver (not shown) or a local connection interface (not shown) in order to alert a third party that the user is in distress. The wearable device 702 may also transmit the location of the user, as determined by GPS or a similar mechanism, via the radio transceiver or a local connection interface.

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

We claim:

1. A wearable electronic device comprising:
a housing including elements configured to be worn on a body of a user;
a subscriber identity module coupled to the housing and storing credentials for a cellular network;
a radio transceiver coupled to the housing and configured to connect to a cellular network using credentials stored in the subscriber identity module;
a sensor coupled to the housing;
one or more processors coupled to the housing; and
a memory communicatively coupled to the one or more processors and coupled to the housing, the memory storing computer-executable instructions that, when executed by the one or more processors, cause the one or more processors to:
receive data from the sensor;
determine that the data is outside of a threshold range; and
at least partially in response to receiving the data and determining that the data is outside of the threshold range, transmit the data or a notification related to the data directly to a cellular access point of the cellular network via the radio transceiver.

2. The wearable electronic device of claim 1, further comprising a feedback component coupled to the housing.

3. The wearable electronic device of claim 2, wherein the feedback component provides vibratory feedback.

4. The wearable electronic device of claim 2, wherein the computer-executable instructions, when executed by the one or more processors, further cause the one or more processors to:
    receive via the radio transceiver a further indication; and
    provide via the feedback component, at least partially in response to the receiving the further indication, feedback to the user of the wearable electronic device.

5. The wearable electronic device of claim 2, wherein the feedback component is a display, the display configured to render images.

6. The wearable electronic device of claim 2, wherein the computer-executable instructions, when executed by the one or more processors, further cause the one or more processors to:
    provide an alert via the feedback component based at least on a reminder set at a specific time of day.

7. The wearable electronic device of claim 1, wherein the housing further includes an attachment mechanism for removeably attaching to one or more physical modules.

8. The wearable electronic device of claim 7, wherein the sensor is one of the one or more physical modules.

9. The wearable electronic device of claim 1, further comprising local connection interface coupled to the housing, the local connection interface configured to transmit a signal to a secondary device.

10. A method comprising:
    receiving, by a wearable electronic device, data from a sensor of the wearable electronic device;
    determining, by the wearable electronic device, that the data is outside of a threshold range;
    providing, by the wearable electronic device, feedback related to the data via a feedback component of the wearable electronic device; and
    transmitting, by the wearable electronic device, the data or a notification related to the data directly to a cellular access point of a cellular network via a radio transceiver of the wearable electronic device configured to connect to the cellular network.

11. The method of claim 10, wherein the radio transceiver is configured to connect to the cellular network using credentials stored in a subscriber identity module of the wearable electronic device.

12. The method of claim 10, further comprising receiving, by the wearable electronic device, at least partially in response to the transmitting, an indication from the cellular access point of the cellular network or a second cellular access point of the cellular network via the radio transceiver.

13. The method of claim 12, further comprising providing, by the wearable electronic device, feedback related to the indication via the feedback component or a second feedback component.

14. The method of claim 13, wherein the feedback component is a display, the display configured to render images associated with the indication received via the radio transceiver.

15. The method of claim 13, wherein the feedback component is configured to provide vibratory feedback.

16. The method of claim 10, further comprising providing, by the wearable electronic device, an alert via the feedback component based at least on a reminder set at a specific time of day.

17. A method comprising:
    receiving, by a wearable electronic device, a signal from a secondary device via a local connection interface of the wearable electronic device;
    determining, by the wearable electronic device, that the secondary device is within a threshold distance from the wearable electronic device;
    receiving, by the wearable electronic device, data from a sensor of the wearable electronic device;
    determining, by the wearable electronic device, that the data is outside of a threshold range;
    transmitting, by the wearable electronic device, the data or a notification regarding the data directly to a cellular access point of a cellular network via a radio transceiver of the wearable electronic device configured to connect to the cellular network; and
    transmitting, by the wearable electronic device, a response signal via the local connection interface at least partially in response to receiving the signal from the secondary device and the secondary device is within the threshold distance.

18. The method of claim 17, further comprising receiving, by the wearable electronic device, at least partially in response to the transmitting the data or the notification regarding the data, an indication from the cellular access point of the cellular network or a second cellular access point of the cellular network via the radio transceiver.

19. The method of claim 18, wherein the response signal includes the indication or a notification regarding the indication.

20. The method of claim 17, wherein the response signal includes the data or a second notification regarding the data.

* * * * *